United States Patent
Chen et al.

(10) Patent No.: US 11,003,065 B2
(45) Date of Patent: May 11, 2021

(54) FILTER MODULE AND PROJECTION DEVICE

(71) Applicant: Coretronic Corporation, Hsin-Chu (TW)

(72) Inventors: Chang-Hsuan Chen, Hsin-Chu (TW); Chien-Chung Liao, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 29 days.

(21) Appl. No.: 16/507,040

(22) Filed: Jul. 10, 2019

(65) Prior Publication Data
US 2020/0026173 A1    Jan. 23, 2020

(30) Foreign Application Priority Data

Jul. 18, 2018 (CN) .......................... 201821136465.X
Jan. 28, 2019 (CN) .......................... 201920143361.X

(51) Int. Cl.
| | | |
|---|---|---|
| *G03B 21/20* | (2006.01) | |
| *G03B 21/16* | (2006.01) | |
| *G03B 21/00* | (2006.01) | |
| *F21V 14/08* | (2006.01) | |

(52) U.S. Cl.
CPC ............ *G03B 21/208* (2013.01); *F21V 14/08* (2013.01); *G03B 21/2033* (2013.01); *G03B 21/008* (2013.01); *G03B 21/16* (2013.01)

(58) Field of Classification Search
CPC ... F21V 14/08; G03B 21/2033; G03B 21/208; G03B 21/2086; G03B 33/08; G03B 21/008; G03B 21/16; G03B 21/204
See application file for complete search history.

(56) References Cited

U.S. PATENT DOCUMENTS

| | | | |
|---|---|---|---|
| 2012/0242912 A1* | 9/2012 | Kitano | H04N 9/3114 348/759 |
| 2013/0208464 A1* | 8/2013 | Huang | G03B 21/2033 362/231 |
| 2015/0354787 A1 | 12/2015 | Chang et al. | |
| 2016/0077326 A1* | 3/2016 | Yamagishi | G02B 7/008 353/61 |
| 2017/0269462 A1* | 9/2017 | Maeda | H04N 9/3111 |

FOREIGN PATENT DOCUMENTS

| | | | | |
|---|---|---|---|---|
| TW | 201007329 | | 2/2010 | |
| TW | 201232080 A | * | 8/2012 | ............. G02B 7/00 |
| TW | 201833655 A | * | 9/2018 | ............. G03B 21/14 |

* cited by examiner

*Primary Examiner* — Michelle M Iacoletti
*Assistant Examiner* — Magda Cruz
(74) *Attorney, Agent, or Firm* — JCIPRNET

(57) ABSTRACT

A filter module having at least one filter region is provided. The filter module is pervious to a first color light with a first waveband in a converted light, and filters a second color light with a second waveband in the converted light. The filter module includes an absorptive filter and a dichroic film. The absorptive filter is located at the at least one filter region, and configured to absorb the second color light with the second waveband. The dichroic film is located on the absorptive filter, and is pervious to the first color light and reflects the second color light. The absorptive filter is configured to absorb the second color light coming from the dichroic film, and is pervious to the first color light. The first waveband is greater than a first wavelength, and the second waveband is smaller than the first wavelength. A projection device is also provided.

22 Claims, 9 Drawing Sheets

FILTER MODULE AND PROJECTION DEVICE

CROSS-REFERENCE TO RELATED APPLICATION

This application claims the priority benefit of China applications serial no. 201821136465.X, filed on Jul. 18, 2018 and serial no. 201920143361.X, filed on Jan. 28, 2019. The entirety of the above-mentioned patent application are hereby incorporated by reference herein and made a part of this specification.

BACKGROUND OF THE INVENTION

Field of the Invention

The invention relates to an optical component and an optical device including the above optical component, and particularly relates to a filter module and a projection device.

Description of Related Art

In recent years, projection devices based on solid-state light sources such as light-emitting diodes (LEDs) and laser diodes have gradually gained a place in the market. Since the laser diodes has a light-emitting efficiency of higher than about 20%, in order to break through the light source limitation of the LEDs, a technique of using a laser light source to excite phosphor to produce a pure color light source required by a projector is gradually developed.

Generally, excitation light of the solid-state light sources may be converted by a wavelength conversion material on a wavelength conversion module of the projection device to generate different colors of excited light. In order to satisfy a demand on color performance, a filter module is placed on a rear optical path of the projection device, such that the color light of different wavebands that is converted by the wavelength conversion module is filtered to form a predetermined color light after passing through the filter module, so as to purify the color and achieve a color saturation effect. The color light purified by the filter module is then transmitted to a light homogenizing element, and transmitted to a subsequent light valve.

However, since the wavelength conversion module of the projection device and a light entrance of an integration rod are designed according to an object image principle, when the wavelength conversion material is excited to emit light, after the light is filtered by the filter module, the light is focused by an optical element and is imaged on the light entrance of the integration rod, and since a position of the filter module is very close to the light entrance of the integration rod, a beam splitting film on the filter module is very close to an imaging position of the focused light. In this way, the focused light is liable to be reflected by the beam splitting film on the filter module, and is returned to the wavelength conversion module through the optical element, such that a temperature of the wavelength conversion module is increased to cause deterioration or burning.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention were acknowledged by a person of ordinary skill in the art.

SUMMARY OF THE INVENTION

The invention is directed to a filter module, which has good optical quality and reliability.

The invention is directed to a projection device, which has good optical quality and reliability.

Other objects and advantages of the invention may be further illustrated by the technical features broadly embodied and described as follows.

In order to achieve one or a portion of or all of the objects or other objects, an embodiment of the invention provides a filter module. The filter module has at least one filter region. The filter module is pervious to a first color light with a first waveband in a converted light, and filters a second color light with a second waveband in the converted light. The filter module includes an absorptive filter and a dichroic film. The absorptive filter is located at the at least one filter region, and is configured to absorb the second color light with the second waveband. The dichroic film is located on the absorptive filter, and is pervious to the first color light and reflects the second color light. The absorptive filter is configured to absorb the second color light coming from the dichroic film, and is pervious to the first color light. The first waveband is greater than a first wavelength.

In order to achieve one or a portion of or all of the objects or other objects, an embodiment of the invention provides a projection device. The projection device includes an illumination system, a light valve and a projection lens. The illumination system is configured to provide an illumination beam, and the illumination system includes an excitation light source, a wavelength conversion module and the aforementioned filter module. The excitation light source is configured to emit an excitation beam. The wavelength conversion module is located on a transmission path of the excitation beam, and is configured to convert the excitation beam into a converted beam. The converted beam includes a first color light with a first waveband and a second color light with a second waveband. The filter module is located on a transmission path of the converted beam. The light valve is located on a transmission path of the illumination beam coming from the illumination system, and is configured to convert the illumination beam into an image beam. The illumination beam includes the first color light. The projection lens is located on a transmission path of the image beam, and the image beam is adapted to pass through the projection lens to form a projection beam.

Based on the above description, the embodiments of the invention have at least one of the following advantages or effects. In the embodiments of the invention, the filter module and the projection device are adapted to absorb a part of the color light to be filtered by the filter module through configuration of the absorptive filter, so as to reduce/avoid possibility that the color light to be filtered is returned to the wavelength conversion module along an original optical path due to reflection of the dichroic film of the filter module. In this way, the risk of deterioration or burning of the wavelength conversion module due to temperature increase of the wavelength conversion module of the projection device is avoided, so as to provide good optical quality and reliability.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
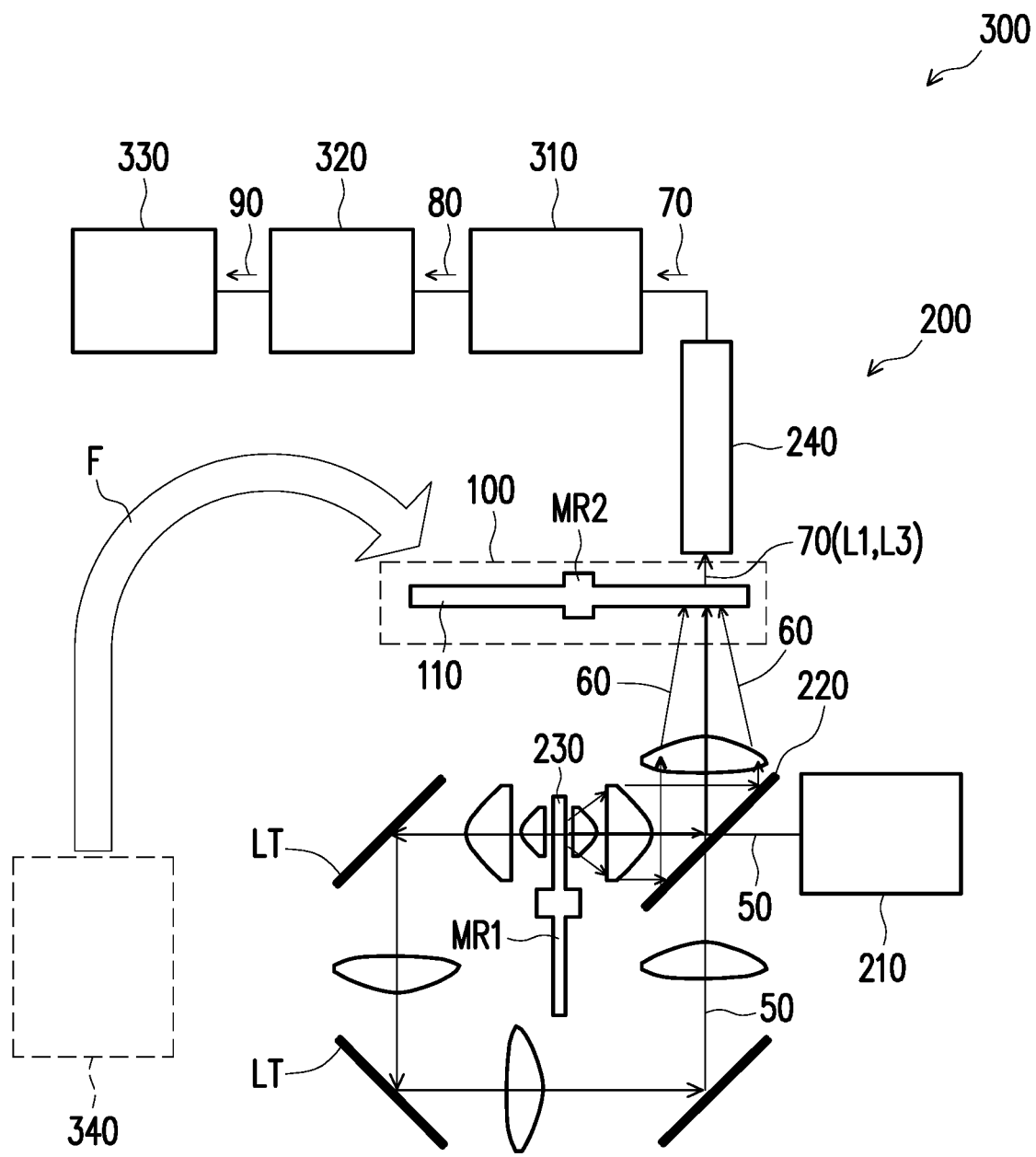
FIG. 1 is a structural schematic diagram of a projection device according to an embodiment of the invention.

FIG. 1 is a structural schematic diagram of a projection device according to an embodiment of the invention. Referring to FIG. 1, the projection device 300 includes an illumination system 200, a light valve 310 and a projection lens 320. The illumination system 200 is configured to provide an illumination beam 70. For example, in the embodiment, the light valve 310 is, for example, a Digital Micro-mirror Device (DMD), a Liquid-Crystal-On-Silicon panel (LCOS panel) or a Liquid Crystal Display (LCD) panel, though the invention is not limited thereto.

To be specific, as shown in FIG. 1, in the embodiment, the illumination system 200 includes an excitation light source 210, a beam splitting unit 220, a wavelength conversion module 230, a filter module 100 and a light homogenizing element 240. As shown in FIG. 1, in the embodiment, the excitation light source 210 is configured to emit an excitation beam 50. In the embodiment, the excitation light source 210 is a laser light source, and the excitation beam is a laser beam. For example, the excitation light source 210 may include a plurality of blue laser diodes (not shown) arranged in an array to provide a blue laser beam, though the invention is not limited thereto. In other embodiments, the laser light source 210 may also be a Light-Emitting Diode (LED), and the excitation beam 50 is a LED beam, though the invention is still not limited thereto.

To be specific, as shown in FIG. 1, in the embodiment, the beam splitting unit 220 is disposed on a transmission path of the excitation beam 50, and is located between the excitation light source 210 and the wavelength conversion module 230. To be specific, the beam splitting unit 220 may be a transflective element, a dichroic element, a polarization beam splitter, or other various elements adapted to splitting a beam. For example, in the embodiment, the beam splitting unit 220 is, for example, pervious to a blue beam, and provides a reflection function to other colors (for example, red, green, yellow, etc.) of beams. Namely, in the embodiment, the beam splitting unit 220 is pervious to the blue excitation beam 50. In this way, the excitation beam 50 may penetrate through the beam splitting unit 220 and is incident to the wavelength conversion module 230.

For example, as shown in FIG. 1, the wavelength conversion module 230 is located on the transmission path of the excitation beam 50. In the embodiment, at least one wavelength conversion region (not shown) of the wavelength conversion module 230 is used for converting the excitation beam 50 into at least one converted beam 60, and reflects the at least one converted beam 60. In the embodiment, the wavelength conversion module 230 is, for example, a transmissive wavelength conversion module, and the excitation beam 50 may penetrate there through. In the embodiment, a non-conversion region (not shown) of the wavelength conversion module 230 is pervious to the excitation beam 50, such that the excitation beam 50 is transmitted to subsequent optical elements.

For example, in the embodiment, the wavelength conversion module 230 may be a rotary phosphor wheel, and may include a first actuator MR1 configured to make the non-conversion region (not shown) and the at least one wavelength conversion region (not shown) to enter an irradiation range of the excitation beam 50 at different time, so as to selectively make the excitation beam 50 to pass through or to be converted into at least one converted beam 60, though the invention is not limited thereto. In another embodiment, the wavelength conversion module 230 may also be a fixed phosphor device, and the excitation beam 50 may be simultaneously incident to the non-conversion region (not shown) and the at least one wavelength conversion region (not shown), so that the excitation beam 50 may simultaneously pass there through or to be converted into the at least one converted beam 60. For example, in an embodiment, the converted beam 60 includes a first color light L1 with a first waveband (which is descried later) and a second color light L2 with a second waveband (which is descried later).

To be specific, as shown in FIG. 1, in the embodiment, when the non-conversion region (not shown) of the wavelength conversion module 230 is located on the transmission path of the excitation beam 50, the excitation beam 50 penetrates through the wavelength conversion module 230, and is transmitted to the filter module 100 through a light transmission module LT. On the other hand, in the embodiment, when at least one wavelength conversion region (not shown) is located on the transmission path of the excitation beam 50, the excitation beam 50 is converted into at least one converted beam 60 by the at least one wavelength conversion region (not shown). Thereafter, as shown in FIG. 1, the at least one converted beam 60 coming from the wavelength conversion module 230 is guided to the beam splitting unit 220, and is reflected to the subsequent filter module 100.

The following is a further explanation of how the filter module 100 filters out a color light with a specific waveband in the converted beam 60 with reference of FIG. 2A to FIG. 2D.

Figure 2A:
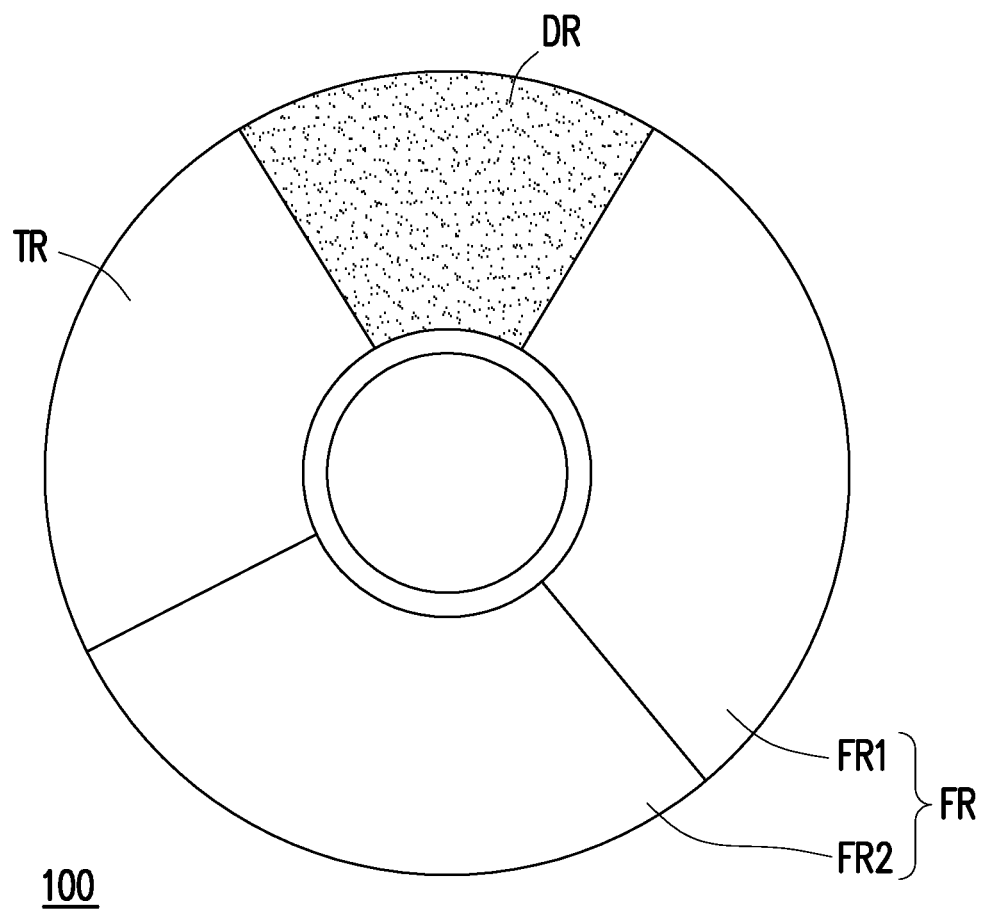
FIG. 2A is a top view of a filter module according to an embodiment of the invention.
Figure 2B:
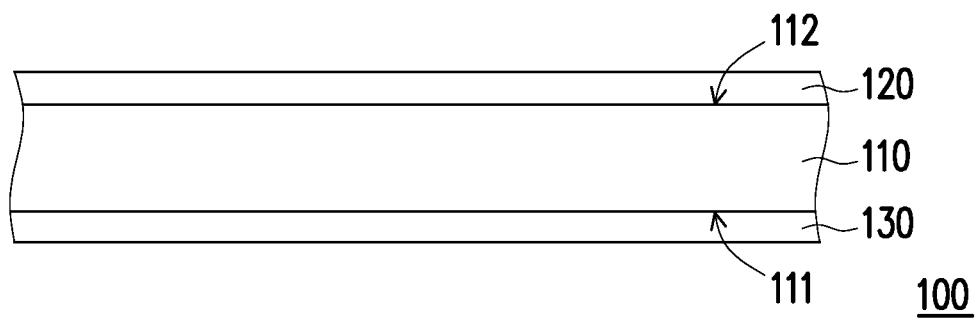
FIG. 2B is a cross-sectional view of the filter module of FIG. 2A.
Figure 2C:
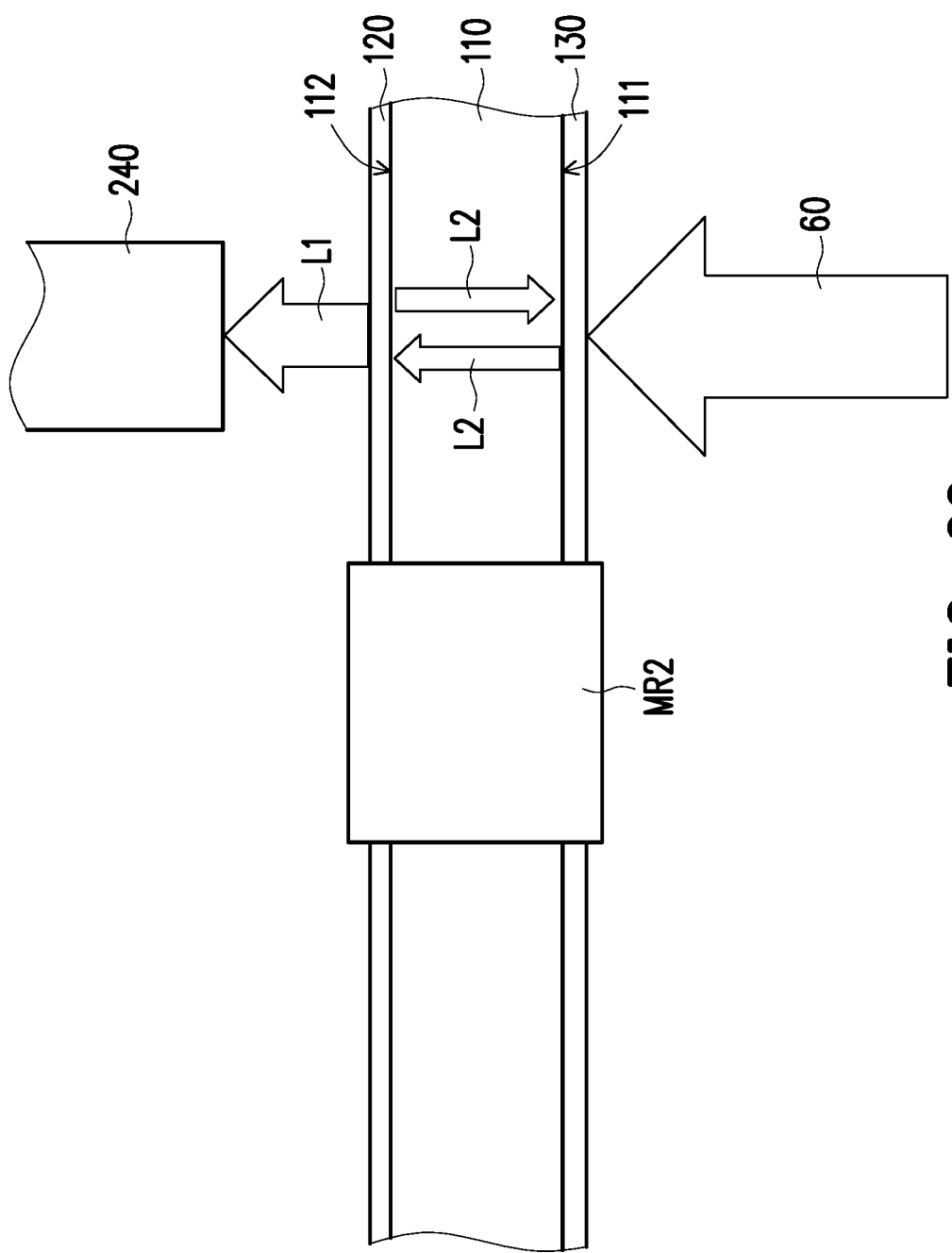
FIG. 2C is a cross-sectional view of a converted beam passing through the filter module of FIG. 2A.
Figure 2D:
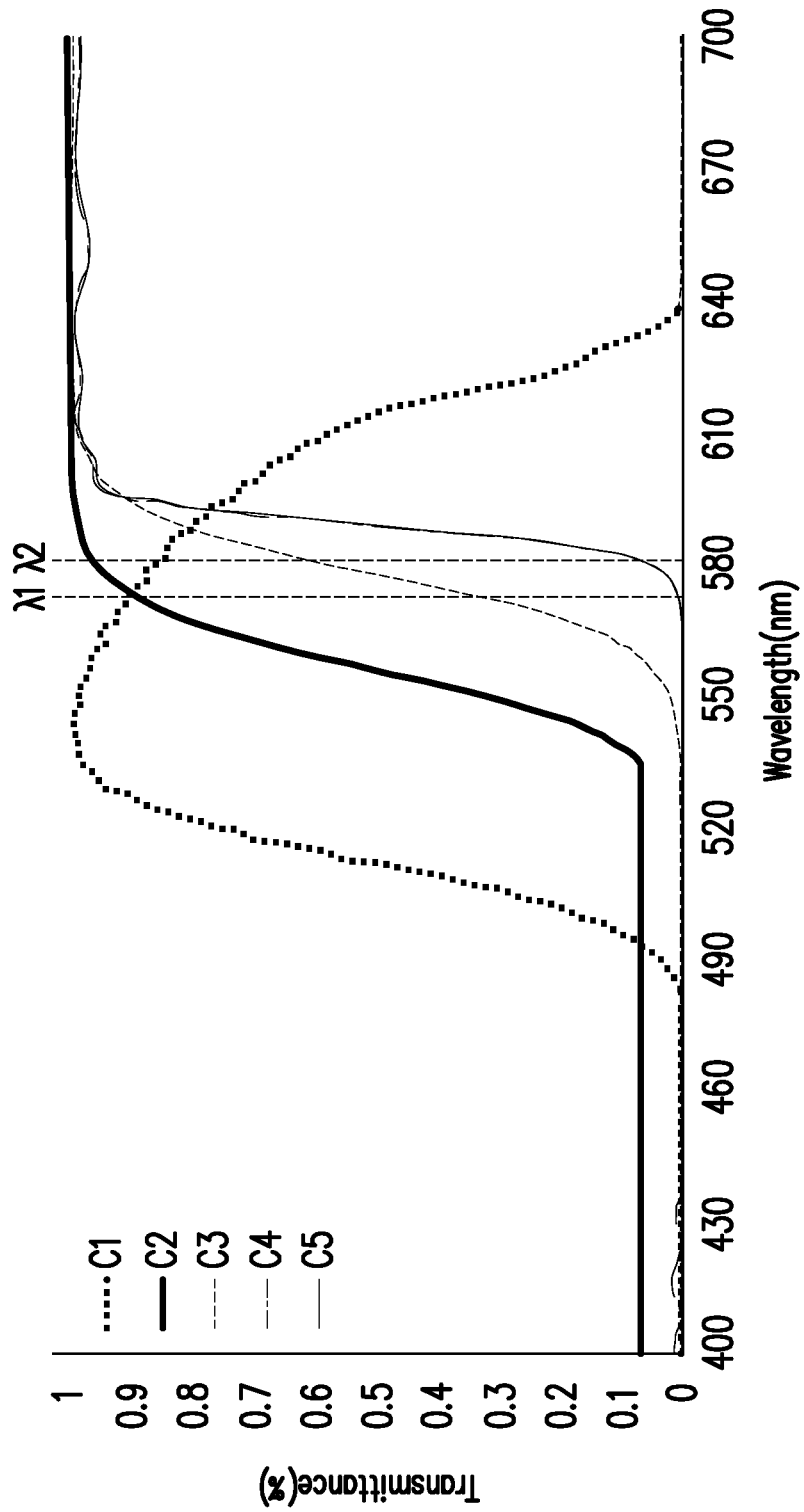
FIG. 2D is a diagram illustrating a relationship between light transmittances and wavelengths of different color light passing through the filter module of FIG. 2A.

FIG. 2A is a top view of a filter module according to an embodiment of the invention. FIG. 2B is a cross-sectional view of the filter module of FIG. 2A. FIG. 2C is a cross-sectional view of the converted beam passing through the filter module of FIG. 2A. FIG. 2D is a diagram illustrating a relationship between light transmittances and wavelengths of different color light passing through the filter module of FIG. 2A. To be specific, as shown in FIG. 1 and FIG. 2A, in the embodiment, the filter module 100 is located on a transmission path of the converted beam 60, and the filter module 100 has at least one filter region FR1, FR2 and a diffuse region DR. In the embodiment, the two filter regions FR1, FR2, for example, construct a filter block FR, though the invention is not limited thereto.

As shown in FIG. 2A to FIG. 2C, in the embodiment, the filter region FR1 of the filter block FR of the filter module 100 is pervious to the first color light L1 with the first waveband in the converted beam 60, and filters the second color light L2 with the second waveband in the converted beam 60. On the other hand, as shown in FIG. 1 and FIG. 2A, the diffuse region DR of the filter module 100 is configured to diffuse the excitation beam 50 into a third color light L3. In the embodiment, the illumination beam 70 includes the first color light L1 and the third color light L3. For example, in the embodiment, the first color light L1 penetrating through the filter region FR1 of the filter module 100 may be a red light, the second color light L2 to be filtered by the filter region FR1 of the filter module 100 may be a green light, and the third light may be a blue light. To be specific, in the embodiment, the waveband (the first waveband) of the first color light L1 is, for example, about between 580 nm and 750 nm, and the waveband (the second waveband) of the second color light L2 is, for example, about less than 570 nm. However, the invention is not limited thereto, and in another embodiment, the first waveband and the second waveband may have other values. However, the above value ranges are only used as an example, and are not used for limiting the invention.

To be specific, as shown in FIG. 2B and FIG. 2C, in the embodiment, the filter module 100 includes an absorptive filter 110, a dichroic film 120 and an antireflection film 130 disposed corresponding to the filter region FR1 of the filter module 100 (located in at least one of the filter regions FR1 and FR2). As shown in FIG. 2B, in the embodiment, the absorptive filter 110 has a first surface 111 and a second surface 112 opposite to each other. For example, in the embodiment, a thickness of the absorptive filter 110 is about 0.7 mm, though the invention is not limited thereto. In other embodiments, the thickness of the absorptive filter 110 may also fall within a range between 0.6 mm and 1.2 mm, though the invention is still not limited thereto. It should be noted that the above value range is only used as an example, and is not used for limiting the invention.

To be specific, as shown in FIG. 2B and FIG. 2C, in the embodiment, the dichroic film 120 is located on the second surface 112 of the absorptive filter 110, and the antireflection film 130 is located on the first surface 111 of the absorptive filter 110, where a surface of the antireflection film 130 is the surface of the filter module 100 where the at least one converted beam 60 is incident to the filter module 100. Therefore, the converted beam 60 may be transmitted to the absorptive filter 110 through the antireflection film 130, and a reflection ratio of the incident converted beam 60 may be reduced, and the converted beam 60 incident at different angles may effectively enter the absorption filter 110, so as to improve a light absorbing efficiency.

Further, as shown in FIG. 2A to FIG. 2D, taking a situation that the absorptive filter 110 is located in the filter region FR1 as an example, the absorptive filter 110 may absorb most of the light with a wavelength less than a specific wavelength. For example, in the embodiment, the absorptive filter 110 is configured to absorb the light with a waveband less than a first wavelength $\lambda 1$. As shown in FIG. 2D, in the embodiment, the first wavelength $\lambda 1$ is about 570 nm. In the embodiment, the first color light L1 is a red light, the second color light L2 is a green light, the first waveband of the first color light L1 is greater than the first wavelength $\lambda 1$, and the second waveband of the second color light L2 is less than the first wavelength $\lambda 1A$, though the invention is not limited thereto. In this way, in the embodiment, the absorptive filter 110 is pervious to the first color light L1, and absorbs a part of the second color light L2 with the second waveband, though the invention is not limited thereto. It should be noted that the above value range is only used as an example, and is not used for limiting the invention.

On the other hand, as shown in FIG. 2C and FIG. 2D, in the embodiment, the dichroic film 120 is located on the absorptive filter 110. The dichroic film 120 is pervious to color light with a waveband greater than a second wavelength $\lambda 2$, and reflects to color light with a waveband less than the second wavelength $\lambda 2$. For example, in the embodiment, the second wavelength $\lambda 2$ is about 580 nm. In the embodiment, the first waveband of the first color light L1 is greater than the second wavelength $\lambda 2$, and the second waveband of the second color light L2 is less than the second wavelength $\lambda 2$, so that the dichroic film 120 may be pervious to the first color light L1 and reflects the second color light L2. It should be noted that the above value range is only used as an example, and is not used for limiting the invention.

In the embodiment, the absorptive filter 110 is configured to absorb the second color light L2 coming from the dichroic film 120. Further, as shown in FIG. 2C, the first color light L1 penetrating through the dichroic film 120 is incident to a subsequent optical element, and the second color light L2 reflected by the dichroic film 120 is again absorbed by the absorptive filter 110.

For example, as shown in FIG. 2D, in the embodiment, a curve C1 represents a luminescence spectrum of the converted beam 60, a curve C2 represents transmittances of the absorptive filter 110 with a thickness of 0.7 mm for color light with different wavebands, a curve C3 represents transmittances of the absorptive filter 110 with the thickness of 1.4 mm for color light with different wavebands, and a curve C4 represents transmittances of the dichroic film 120 for color light with different wavebands. A curve C5 represents a luminescence spectrum of light passing through the filter module 100. As shown by the curve C2 of FIG. 2D, in the embodiment, when a light beam passes through the absorptive filter 110 with the thickness of 0.7 mm, the absorptive filter 110 may absorb most of the second color light L2. As shown by the curve C3, in the embodiment, when the light beam passes through the absorptive filter 110 with the thickness of 1.4 mm (i.e. the light beam reciprocates through the absorptive filter 110 twice), the absorptive filter 110 may almost have a full absorption effect on the second color light L2. Moreover, as shown by the curve C5 of FIG. 2D, in the embodiment, a transmittance of the first color light L1 of the absorptive filter 110 is greater than 90%. It should be noted that the above value range is only used as an example, and is not used for limiting the invention.

However, as shown by the curves C2, C3 of FIG. 2D, in the embodiment, by configuring the dichroic film 120, the light beam may reciprocate through the absorptive filter 110 twice, so that the absorptive filter 110 may have the full absorption effect on the second color light L2, so as to achieve an effect of completely separating the second color light L2 and the first color light L1. In this way, the filter module 100 may achieve a complete color light filtering effect, so as to achieve a color point purification effect.

As described above, in the embodiment, based on the values of FIG. 2D, it is learned that about 47.2% of total energy of the converted beam 60 is absorbed by the absorptive filter 110, 22.4% of the total energy of the converted beam 60 (i.e. the color light with the luminescence waveband between 570 nm and 580 nm) is reflected by the dichroic film 120, and the other portion is the energy of the first color light L1 transmitted to the subsequent optical engine system. It should be noted that the above value ranges are only used as an example, and are not used for limiting the invention.

In this way, the filter module 100 may filter through the first color light L1, and filter out the second color light L2. Moreover, by configuring the absorptive filter 110 to absorb the color light to be filtered by the filter module 100, the possibility that the color light to be filtered returns to the wavelength conversion module 230 along an original optical path due to reflection of the dichroic film of the filter module 100 is reduced/avoided. In this way, the risk of deterioration or burning of the wavelength conversion module 230 due to temperature increase of the wavelength conversion module 230 of the projection device 300 is avoided, so as to provide good optical quality and reliability.

However, in the aforementioned embodiment, although the situation that the absorptive filter 110 of the filter module 100 is pervious to the first color light L1 of the red light is taken as an example for description, the invention is not limited thereto. In other embodiments, the absorptive filter 110 of the filter module 100 may also be pervious to color light of other colors, which may be properly modified by those skilled in the art, and is still considered to be within a protection scope of the invention. Some embodiments are provided below for further description.

Figure 2E:
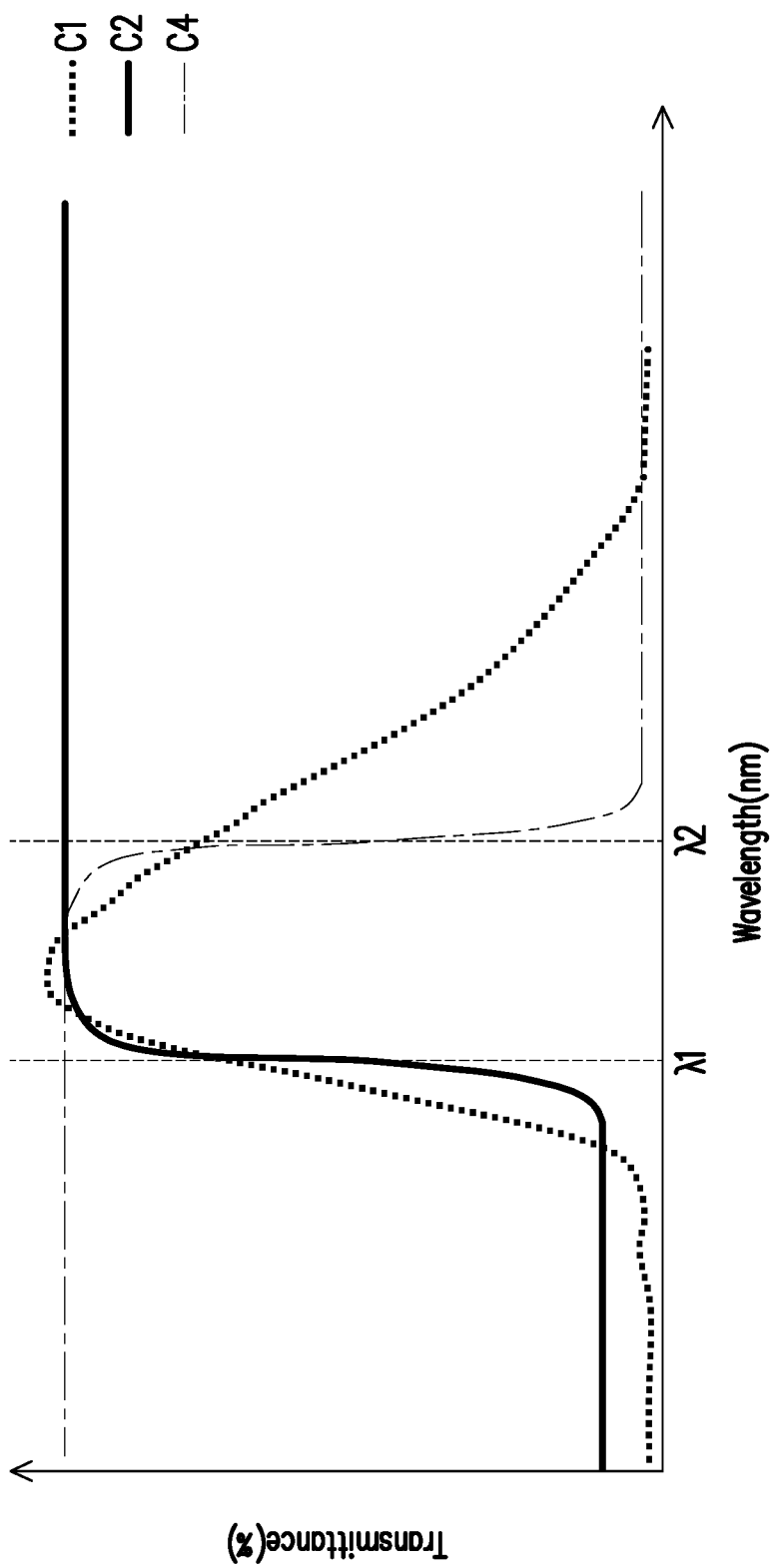
FIG. 2E is a diagram illustrating a relationship between light transmittances and wavelengths of different color light of another filter module of the invention.

FIG. 2E is a diagram illustrating a relationship between light transmittances and wavelengths of different color light of another absorptive filter of the invention. The absorptive filter of FIG. 2E is similar to the absorptive filter of FIG. 2D, and a difference there between is as follows. In the embodiment, the absorptive filter of FIG. 2E is configured to absorb most of light with a luminescence waveband less than 469 nm, i.e. as shown by the curve C2, in the embodiment, the first wavelength λ1 is 469 nm. On the other hand, as shown by the curve C4, in the embodiment, the dichroic film adopted in FIG. 2E is pervious to the color light with a waveband less than the second wavelength λ2, and reflects the color light with a waveband greater than the second wavelength λ2, where the second wavelength λ2 is 599 nm. In this way, the filter block FR of the filter module 100 adopting the aforementioned absorptive filter and the dichroic film may be pervious to light with a waveband between 469 nm and 599 nm, i.e. in the embodiment, the first color light L1 is, for example, a green light, and the first waveband of the first color light L1 is between 469 nm and 599 nm, and the second color light L2 is, for example, a red light. In another embodiment, the first color light L1 may still be the green light, the second color light L2 is, for example, still the red light, the first wavelength λ1 may be 509 nm, and the second wavelength λ2 is 573 nm. In this way, the first waveband of the first color light L1 may be between 509 nm and 573 nm, and the invention is not limited thereto. In brief, in the aforementioned embodiment, the green light passes through and the red light is reflected. It should be noted that the above value ranges and the color of the first/second color light are all used as an example, and are not used for limiting the invention.

Similarly, the other filter region FR2 of the filter module 100 may have the similar/same application, and the other filter region FR2 of the filter module 100 achieves the similar/same effect and advantages with that of the filter region FR1, which is not repeated.

Moreover, the conventional filter region of the filter module that does not adopt the absorptive filter is generally coated with multiple layers of dichroic films in order to implement dual-waveband selection for green light penetration. However, by configuring the absorptive filter, the filter module 100 of the embodiment may implement selection of one of the wavebands, so that the required layers of the dichroic films are reduced, and the cost of film coating is saved.

Then, referring to FIG. 1 and FIG. 2A again, the filter module 100 is located on the transmission path of the excitation beam 50 and the converted beam 60, and includes a second actuator MR2 configured to make the filter regions FR1, FR2 (the filter block FR) having different adsorptive filters 110 to correspondingly enter an irradiation range of the converted beam 60 at different time, so as to respectively form the red first color light L1 and the green first color light L1 (for example, the red first color light L1 formed through the filter region FR1 and the green first color light L1 formed through the filter region FR2). On the other hand, the diffuse region DR may also correspondingly enter the irradiation range of the excitation beam 50 transmitted to the filter module 100 at a different time, so as to form the blue third color light L3. In this way, the excitation beam 50 and the converted beam 60 are sequentially converted into the illumination beam 70 with a plurality of different colors. Moreover, the filter module 100 may selectively have a transparent region TR configured to adjust a color light proportion in the illumination beam 70.

Then, as shown in FIG. 1, in the embodiment, the light homogenizing element 240 is located on the transmission path of the illumination beam 70, and is located between the filter module 100 and the light valve 310. In the embodiment, the light homogenizing element 240 includes an integration rod, though the invention is not limited thereto. To be more specific, as shown in FIG. 1, when the illumination beam 70 is transmitted to the light homogenizing element 240 through the illumination system 200, the light homogenizing element 240 may uniform the illumination beam 70, and transmit the uniformed illumination beam 70 to the light valve 310.

Then, as shown in FIG. 1, the light valve 310 is located on a transmission path of the illumination beam 70 coming from the illumination system 200, and is configured to convert the illumination beam 70 into an image beam 80. The projection lens 320 is located on a transmission path of the image beam 80, and is configured to receive the image beam 80 to form a projection beam 90, and projects the projection beam 90 onto a screen 330 to form an image. After the illumination beam 70 is incident to the light valve 310, the light valve 310 may convert the illumination beam 70 into the image beam 80 of different colors, and transmit the same to the projection lens 320, so that the projected image becomes a color image.

Moreover, referring to FIG. 1, the projection device 300 may selectively include a cooling module 340. The cooling module 340 is configured to provide a cooling airflow F, where the cooling airflow F flows to the filter module 100 to provide a cooling effect. In this way, temperature increase of the filter module 100 of the projection device 300 is avoided, so as to improve reliability of the projection device 300.

Figure 3:
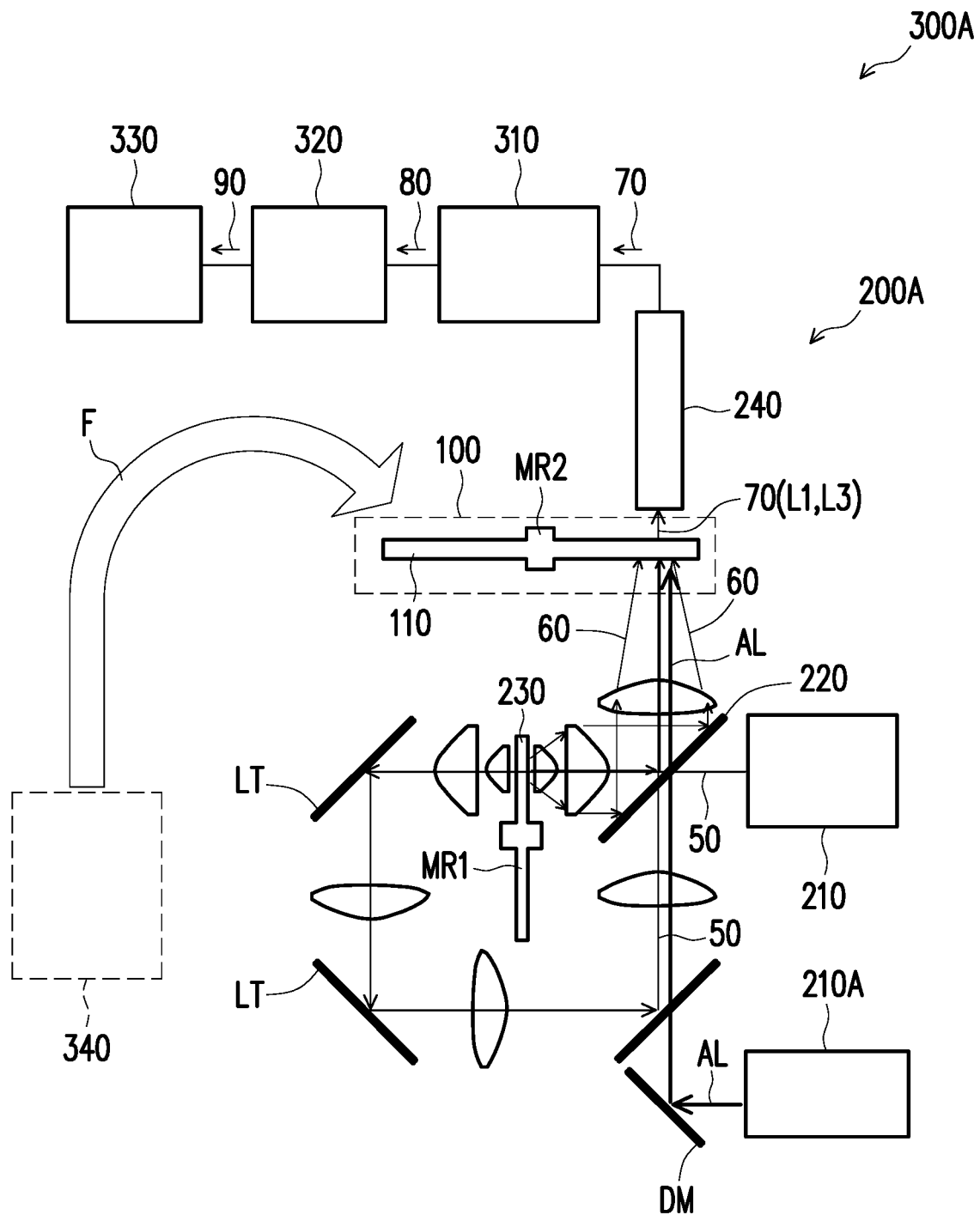
FIG. 3 is a structural schematic diagram of another projection device according to an embodiment of the invention.

FIG. 3 is a structural schematic diagram of another projection device according to an embodiment of the invention. The projection device 300A of FIG. 3 is similar to the projection device 300 of FIG. 1, and a difference there between is as follows. In the embodiment, the illumination system 200A of the projection device 300A further includes an auxiliary light source 210A. The auxiliary light source 210A is configured to emit an auxiliary beam AL. In the embodiment, a wavelength range of the auxiliary beam AL is overlapped with the first waveband, though the invention is not limited thereto. For example, in the embodiment, the auxiliary beam AL is the red light, though the invention is not limited thereto. In other embodiments, the auxiliary beam AL may have other colors. Moreover, the light transmission module LT of the illumination system 200 includes an optical element DM, and the optical element DM is located on the transmission path of the excitation beam 50 and the auxiliary beam AL. In the embodiment, the optical element DM is, for example, a reflector. In other embodiments, the optical element DM may be a dichroic mirror (DMR) with a red light reflection function, which is adapted to provide a reflection function to the red light. In this way, the auxiliary beam AL may be transmitted to the filter module 100 through the optical element DM, and is transmitted to the light homogenizing element 240 after passing through the filter module 100.

In this way, in the projection device 300A of the above embodiment, by configuring the auxiliary light source 210A of the illumination system 200A, a proportion of the red light in the illumination beam 70 is increased, so as to improve the red color performance of the projection image. Moreover, in the embodiment, since the projection device 300A and the projection device 300 of FIG. 1 have the same the same structure of the filter module 100, the projection device 300A may achieve the similar effects and advantages with that of the aforementioned projection device 300, and details thereof are not repeated.

Figure 4A:
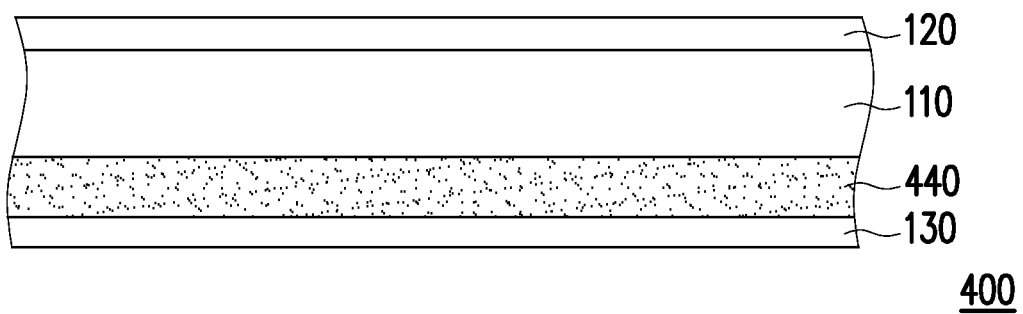
FIG. 4A is a cross-sectional view of another filter module according to an embodiment of the invention.
Figure 4B:
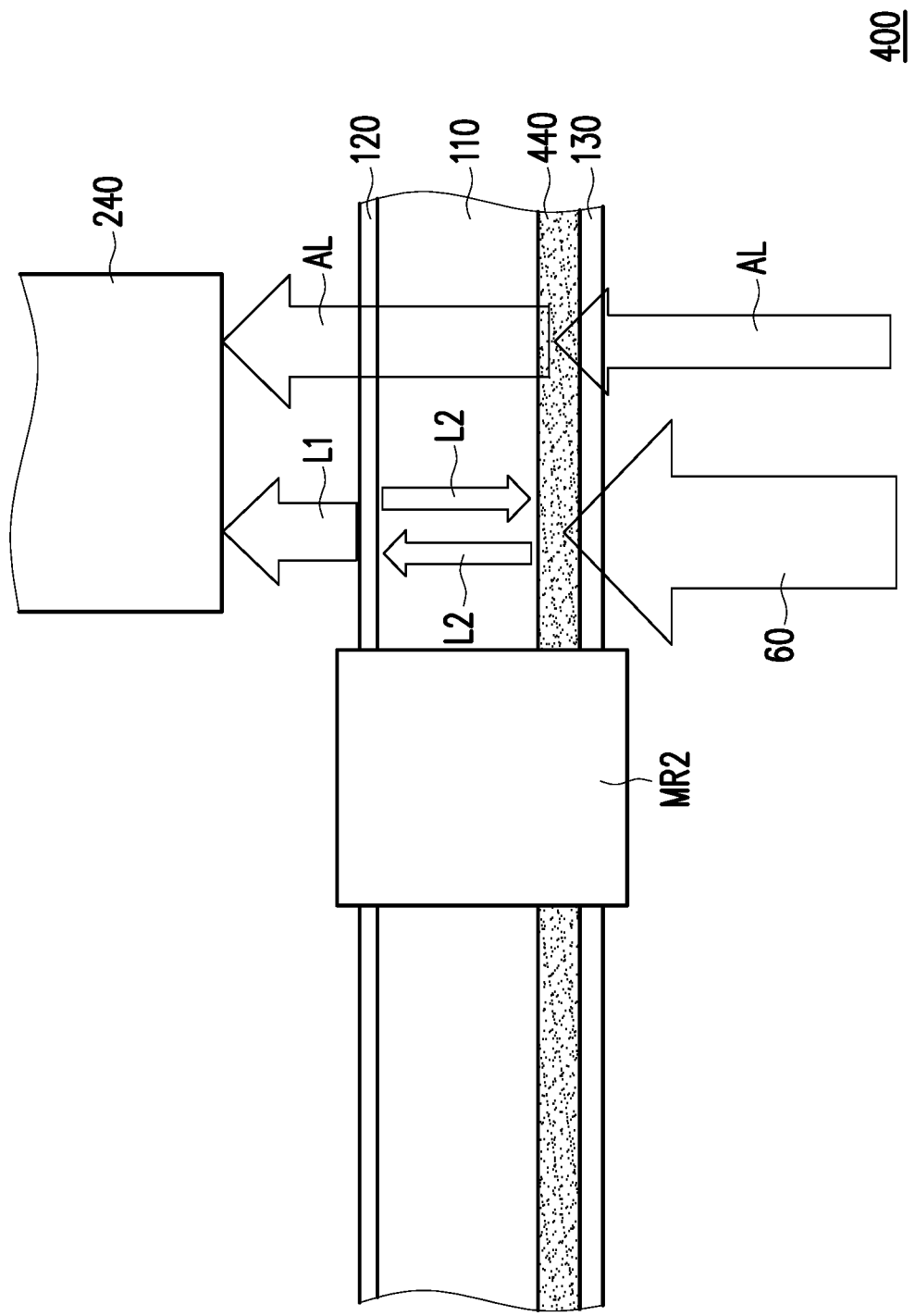
FIG. 4B is a cross-sectional view of the converted beam passing through the filter module of FIG. 4A.

FIG. 4A is a cross-sectional view of another filter module according to an embodiment of the invention. FIG. 4B is a cross-sectional view of the converted beam passing through the filter module of FIG. 4A. The filter module 400 of FIG. 4A is similar to the filter module 100 of FIG. 1, and a difference there between is as follows. In the embodiment, the filter module 400 further includes a diffuse portion 440. The diffuse portion 440 is located between the antireflection film 130 and the absorptive filter 110. For example, in the embodiment, the diffuse portion 440 may be a diffuser, which is formed by attaching to a surface of the absorptive filter 110, or the diffuse portion 440 may be formed by etching the surface of the main body of the absorptive filter 110, which is not limited by the invention.

Based on the above description, as shown in FIG. 4B, in the filter module 400 of the above embodiment, by configuring the diffuse portion 440, coherence of the laser beam may be spoiled, so as to achieve a function of eliminating laser spots, and by applying the same to the aforementioned projection device 300A, a phenomenon of laser spots probably formed by the auxiliary beam AL is eliminated. Moreover, in the embodiment, since the filter module 400 and the filter module 100 of FIG. 1 have the similar structure, when the filter module 400 is applied to the projection device 300A, the projection device 300A may achieve the similar effects and advantages, and details thereof are not repeated.

In the aforementioned embodiment, although a situation that the illumination systems 200, 200A of the projection devices 300, 300A all include the transmissive wavelength conversion module 230 is taken as an example for description, the invention is not limited thereto. In other embodiments, the wavelength conversion module may also be a reflective wavelength conversion module, and optical paths thereof may be properly modified by anyone skilled in the art, which is still considered to be within a protection scope of the invention. Another embodiment is provided below for further description.

Figure 5:
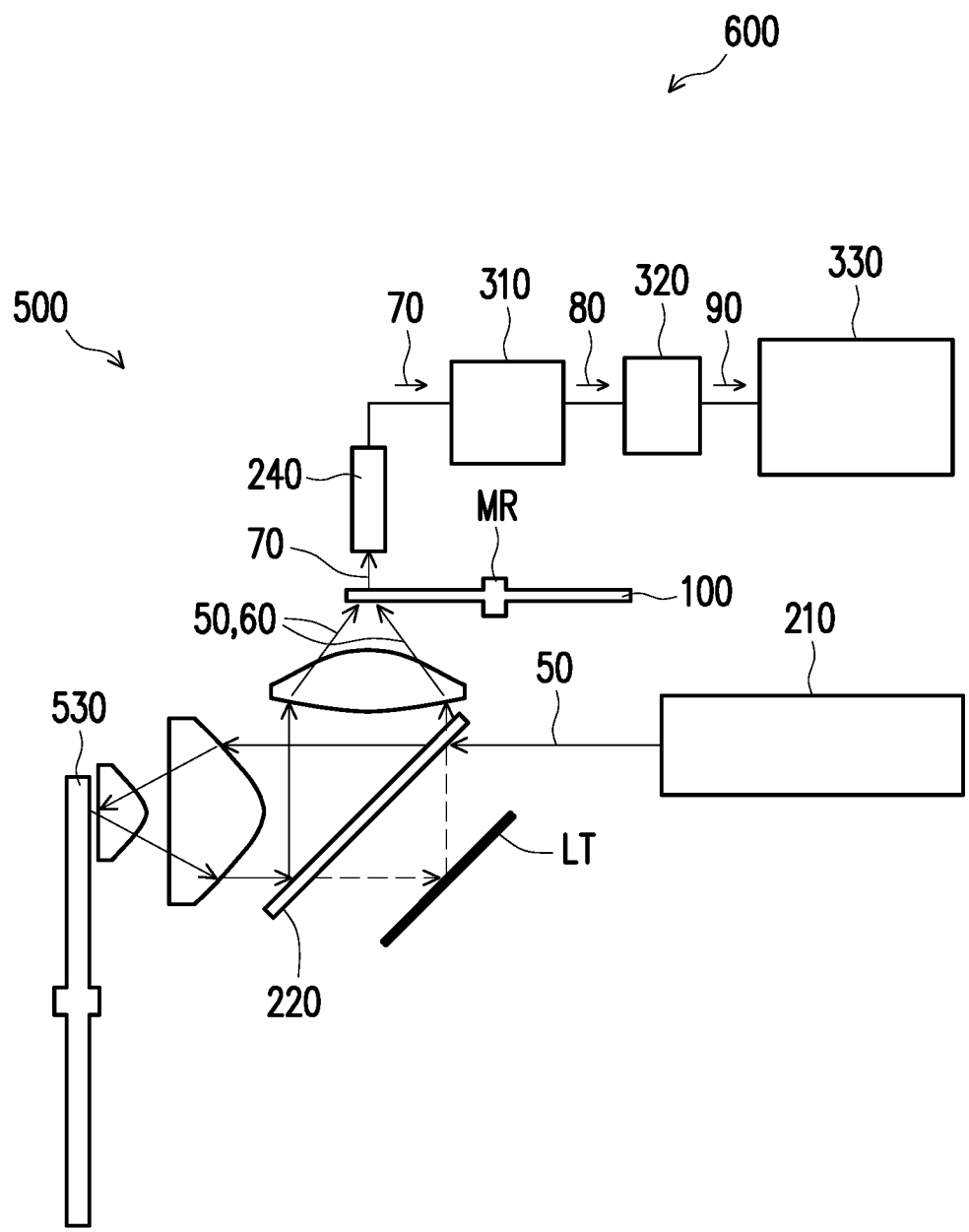
FIG. 5 is a structural schematic diagram of a projection device according to an embodiment of the invention.

FIG. 5 is a structural schematic diagram of a projection device according to an embodiment of the invention. Referring to FIG. 5, the projection device 600 of the embodiment is similar to the projection device 300 of FIG. 1, and differences there between are as follows. In the embodiment, the illumination system 500 of the projection device 600 adopts a wavelength conversion module 530 with a reflection layer structure. Namely, the wavelength conversion module 530 is a reflective wavelength conversion module, and is used for reflecting the excitation beam 50.

To be specific, as shown in FIG. 5, in the embodiment, when the non-conversion region (not shown) of the wavelength conversion module 530 is located on the transmission path of the excitation beam 50, the excitation beam 50 coming from the wavelength conversion module 530 may be reflected and guided to the beam splitting unit 220 and the light transmission module LT, and reflected to the subsequent filter module 100. On the other hand, in the embodiment, when at least one wavelength conversion region (not shown) is located on the transmission path of the excitation beam 50, the excitation beam 50 is converted into at least one converted beam 60 by the at least one wavelength conversion region (not shown). Thereafter, as shown in FIG. 5, the at least one converted beam 60 coming from the wavelength conversion module 530 may be guided to the beam splitting unit 220 and the light transmission module LT, and reflected to the subsequent filter module 100. Thereafter, the excitation beam 50 and the at least one converted beam 60 respectively form the red (or green) first color light and the blue third color light (not shown) through the filter module 100, and accordingly form the subsequent illumination beam 70 and the image beam 80. In this way, by adopting the aforementioned filter module 100, the projection device 600 may also achieve the similar effects and advantages with that of the aforementioned projection device 300, and details thereof are not repeated.

In summary, the embodiments of the invention have at least one of the following advantages and effects. In the embodiments of the invention, the filter module and the projection device are adapted to absorb a part of the color light to be filtered by the filter module through configuration of the absorptive filter, so as to reduce/avoid possibility that the color light to be filtered is returned to the wavelength conversion module along an original optical path due to reflection of the dichroic film of the filter module. In this way, the risk of deterioration or burning of the wavelength conversion module due to temperature increase of the wavelength conversion module of the projection device is avoided, so as to provide good optical quality and reliability.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A filter module, having at least one filter region, and characterized in that the filter module is pervious to a first color light with a first waveband in a converted beam, and filters a second color light with a second waveband in the converted beam, wherein the filter module comprises:
    an absorptive filter, located at the at least one filter region, and configured to absorb the second color light with the second waveband; and
    a dichroic film, located on the absorptive filter, and pervious to the first color light and reflecting the second color light, wherein the absorptive filter is configured to absorb the second color light coming from the dichroic film, and is pervious to the first color light.

2. The filter module as claimed in claim 1, wherein a transmittance of the first color light of the absorptive filter is greater than 90%.

3. The filter module as claimed in claim 1, wherein the first waveband is between 580 nm and 750 nm.

4. The filter module as claimed in claim 3, wherein a first wavelength is 570 nm, the dichroic film is pervious to color light with a waveband greater than a second wavelength, the dichroic film reflects color light with a waveband less than the second wavelength, and the second waveband is smaller than the first wavelength, the second wavelength is 580 nm.

5. The filter module as claimed in claim 1, wherein the first waveband is between 469 nm and 599 nm.

6. The filter module as claimed in claim 5, wherein a first wavelength is 469 nm, the dichroic film is pervious to color light with a waveband less than a second wavelength, the dichroic film reflects color light with a waveband greater than the second wavelength, and the second waveband is greater than the first wavelength, the second wavelength is 599 nm.

7. The filter module as claimed in claim 1, wherein the first waveband is between 509 nm and 573 nm, a first wavelength is 509 nm, the dichroic film is pervious to color light with a waveband less than a second wavelength, the dichroic film reflects color light with a waveband greater than the second wavelength, and the second waveband is greater than the first wavelength, the second wavelength is 573 nm.

8. The filter module as claimed in claim 1, wherein the absorptive filter has a first surface and a second surface opposite to each other, the dichroic film is located on the second surface of the absorptive filter, and the filter module further comprises:
    an antireflection film, located on the first surface of the absorptive filter.

9. The filter module as claimed in claim 8, further comprising:
    a diffuse portion, located between the antireflection film and the absorptive filter.

10. A projection device, comprising an illumination system, a light valve, and a projection lens, wherein:
    the illumination system is configured to provide an illumination beam, and the illumination system comprising an excitation light source, a wavelength conversion module, and a filter module, wherein:
        the excitation light source is configured to emit an excitation beam;

the wavelength conversion module is located on a transmission path of the excitation beam, and configured to convert the excitation beam into a converted beam, wherein the converted beam comprises a first color light with a first waveband and a second color light with a second waveband; and the filter module is located on a transmission path of the converted beam, and having at least one filter region, and being pervious to the first color light with the first waveband in the converted beam, and filtering the second color light with the second waveband in the converted beam, and the filter module comprising an absorptive filter and a dichroic film, wherein:

the absorptive filter is located at the at least one filter region, and configured to absorb the second color light with the second waveband; and the dichroic film is located on the absorptive filter, and pervious to the first color light and reflecting the second color light, wherein the absorptive filter is configured to absorb the second color light coming from the dichroic film, and is pervious to the first color light;

the light valve is located on a transmission path of the illumination beam coming from the illumination system, and configured to convert the illumination beam into an image beam, wherein the illumination beam comprises the first color light; and the projection lens is located on a transmission path of the image beam, and the image beam being adapted to pass through the projection lens to form a projection beam.

11. The projection device as claimed in claim 10, wherein the illumination system further comprises:

a light homogenizing element, located between the filter module and the light valve, and located on a transmission path of the illumination beam to uniform the illumination beam.

12. The projection device as claimed in claim 11, wherein the illumination system further comprises:

an auxiliary light source, configured to emit an auxiliary beam, a wavelength range of the auxiliary beam being overlapped with the first waveband, wherein the auxiliary beam is transmitted to the light homogenizing element after passing through the filter module.

13. The projection device as claimed in claim 10, wherein a transmittance of the first color light of the absorptive filter is greater than 90%.

14. The projection device as claimed in claim 10, wherein the first waveband is between 580 nm and 750 nm.

15. The projection device as claimed in claim 10, wherein a first wavelength is 570 nm, the dichroic film is pervious to color light with a waveband greater than a second wavelength, the dichroic film reflects color light with a waveband less than the second wavelength, and the second waveband is smaller than the first wavelength, the second wavelength is 580 nm.

16. The projection device as claimed in claim 10, wherein the first waveband is between 469 nm and 599 nm.

17. The projection device as claimed in claim 16, wherein a first wavelength is 469 nm, the dichroic film is pervious to color light with a waveband less than a second wavelength, the dichroic film reflects color light with a waveband greater than the second wavelength, and the second waveband is greater than the first wavelength, the second wavelength is 599 nm.

18. The projection device as claimed in claim 16, wherein the filter module further comprises:

a diffuse portion, located between the antireflection film and the absorptive filter.

19. The projection device as claimed in claim 10, wherein the first waveband is between 509 nm and 573 nm, a first wavelength is 509 nm, the dichroic film is pervious to color light with a waveband less than a second wavelength, the dichroic film reflects color light with a waveband greater than the second wavelength, and the second waveband is greater than the first wavelength, the second wavelength is 573 nm.

20. The projection device as claimed in claim 10, wherein the absorptive filter has a first surface and a second surface opposite to each other, the dichroic film is located on the second surface of the absorptive filter, and the filter module further comprises:

an antireflection film, located on the first surface of the absorptive filter.

21. The projection device as claimed in claim 10, further comprising:

a cooling module, configured to provide a cooling airflow, wherein the cooling airflow flows to the filter module.

22. The projection device as claimed in claim 10, wherein the filter module has a diffuse region, the diffuse region is configured to diffuse the excitation beam into a third color light, wherein the illumination beam comprises the first color light and the third color light.

* * * * *